(12) United States Patent
Kung

(10) Patent No.: US 8,870,155 B2
(45) Date of Patent: Oct. 28, 2014

(54) SLEEVE DRIVEN VALVE

(71) Applicant: Wan-Rong Kung, Kaohsiung (TW)

(72) Inventor: Wan-Rong Kung, Kaohsiung (TW)

(*) Notice: Subject to any disclaimer, the term of this patent is extended or adjusted under 35 U.S.C. 154(b) by 0 days.

(21) Appl. No.: 13/792,382

(22) Filed: Mar. 11, 2013

(65) Prior Publication Data

US 2014/0209827 A1 Jul. 31, 2014

(30) Foreign Application Priority Data

Jan. 30, 2013 (TW) .............................. 102103393 A

(51) Int. Cl.
*F16K 31/50* (2006.01)

(52) U.S. Cl.
CPC .................................... *F16K 31/508* (2013.01)
USPC ......................................... 251/214; 251/329

(58) Field of Classification Search
USPC ......................................... 251/214, 326–329
See application file for complete search history.

(56) References Cited

U.S. PATENT DOCUMENTS

| | | | | |
|---|---|---|---|---|
| 3,033,517 A * | 5/1962 | Rovang et al. | ................. | 251/214 |
| 4,340,204 A * | 7/1982 | Herd | ............................. | 251/327 |
| 4,440,381 A * | 4/1984 | Tipton, Jr. | .................... | 251/214 |
| 4,463,930 A * | 8/1984 | Vamvakas | ..................... | 251/326 |
| 4,944,488 A * | 7/1990 | Clayson | ........................ | 251/214 |
| 5,454,547 A * | 10/1995 | Brown | ......................... | 251/214 |
| 5,743,288 A * | 4/1998 | Mosman et al. | ............. | 251/327 |
| 2012/0248360 A1 * | 10/2012 | Olvera et al. | ................. | 251/265 |

* cited by examiner

*Primary Examiner* — John Bastianelli
(74) *Attorney, Agent, or Firm* — Alan Kamrath; Kamrath IP Lawfirm, P.A.

(57) ABSTRACT

A valve includes a plug mounted to a lower end of a valve rod extending into a chamber in a top portion of a body and in communication with a fluid passage of the body. The valve rod extends through a cap mounted to the top portion of the body. A bottom portion of a top cover is mounted to a top end of the cap. A sleeve is received in a compartment in a top portion of the top cover and is threadedly engaged with an upper end of the valve rod. A hand wheel is mounted to the sleeve. A lower end of the sleeve extends through at least one bearing mounted in the compartment of the top cover. When the hand wheel is rotated, the sleeve is driven to move the valve rod and the plug to open or close the fluid passage.

5 Claims, 7 Drawing Sheets

SLEEVE DRIVEN VALVE

BACKGROUND OF THE INVENTION

The present invention relates to a valve and, more particularly, to a valve for controlling opening or closing of a fluid passage in pipes.

A valve is generally used in pipes to control opening or closing of a fluid passage in the pipes conveying a fluid. When the components of the valve malfunction due to corrosion by the fluid in the pipes or due to aging, maintenance of the valve is required to avoid loss resulting from leakage of the fluid.

FIG. 1 shows a conventional valve 10 including a body 12, a cap 14, and a top seat 16 mounted on top of the cap 14. The body 12 includes an inlet 17 and an outlet 18 for connection with pipes conveying a fluid. A chamber 19 is formed in a top portion of body 12. A valve rod 20 includes a lower end 22 extending into the chamber 19 and connected to a plug 24. A hand wheel 28 is mounted to an upper end 26 of the valve rod 20. A sleeve 29 is provided in a center of the hand wheel 28 and receives the upper end 26 of the valve rod 20. The sleeve 29 is fixed by a fastener 30 to the top seat 16. When a user rotates the hand wheel 28, the valve rod 20 and the plug 24 move upward or downward to open or close the fluid passage between the inlet 17 and the outlet 18. The cap 14 is fixed by screws 31 to the top portion of the body 12. A pressing block 32 is mounted on top of the cap 14. Fillers 34 are mounted in the cap 14 and sandwiched by bushings 36 on upper and lower sides of the fillers 34. When two nuts engaged on two tightening bolts 38 are rotated to press against the fillers 34 via the pressing block 32 and the upper bushing 36, the fillers 34 seal a gap between the valve rod 20 and the cap 14, avoiding leakage of the fluid via the chamber 19.

However, the body 12 and the cap 14 are formed by casting and, thus, have voids in inner faces thereof. The voids turn into slits due to chemical corrosion after a period of time, resulting in leakage of the fluid. Furthermore, the fastener 30 and the top seat 16 include threads 39 that are liable to get stuck due to rusting resulting from dust, particles, and moisture in the air, such that the hand wheel 28 can not be rotated. For a valve in a factory near a sea, the threading engagement section between the fastener 30 and the top seat 16 and the threading engagement section between the valve rod 20 and the sleeve 29 are liable to get stuck due to corrosion by the sea wind. Thus, the hand wheel 28 can not be rotated to move the valve rod 20 and the plug 24. Further, to allow smooth upward/downward movement of the valve rod 20, the valve rod 20 is in loose coupling with the fillers 34 and the bushings 36. To allow replacement of the fillers 34 without stopping the machine, the fillers 34 are generally C-shaped in cross section and have an opening. After removing the damaged fillers 34 out of the cap 14, new fillers 34 can be mounted around the valve rod 20 into the cap 14 via the opening of each filler 34 without the need of mounting through the upper end 26 of the valve rod 20. However, the openings of the fillers 34 adversely affect the sealing function of the fillers 34 and make themselves vulnerable.

BRIEF SUMMARY OF THE INVENTION

An objective of the present invention is to provide a valve including a body and a cap that are formed by forging to avoid voids in the inner faces of the body and the cap, such that slits are less likely to be generated in the valve due to chemical corrosion at the voids.

Another objective of the present invention is to provide at least one bearing in a top cover of the valve for receiving a sleeve, allowing smooth rotation of a hand wheel of the valve.

A further objective of the present invention is to provide a valve having a structure enhancing the sealing function of fillers in the valve.

In an aspect, a valve includes a body having an interior defining a fluid passage. The body includes a top portion having a chamber in communication with the fluid passage. A valve rod includes upper and lower ends spaced from each other in a longitudinal direction. The valve rod further includes an intermediate portion between the upper and lower ends of the valve rod. The lower end of the valve rod extends into the chamber. A plug is mounted to the lower end of the valve rod. A hand wheel is mounted to the upper end of the valve rod. A cap is mounted to the top portion of the body. The cap includes top and bottom ends spaced from each other in the longitudinal direction and an axial hole extending from the top end through the bottom end. The intermediate portion of the valve rod extends through the axial hole of the cap. A top cover includes top and bottom portions spaced from each other in the longitudinal direction. The bottom portion of the top cover is mounted to the top end of the cap. The top portion of the top cover includes a compartment. A sleeve is received in the compartment and has a screw hole. The upper end of the valve rod extends through and is threadedly engaged with the screw hole. The upper end of the sleeve extends beyond the top cover and is engaged with the hand wheel. At least one bearing is mounted in the compartment of the top cover. The lower end of the sleeve extends through the at least one bearing. When the hand wheel is rotated, the sleeve is driven to move the valve rod and the plug to open or close the fluid passage.

In an embodiment, the compartment includes two enlarged annular sections spaced from each other in the longitudinal direction. The at least one bearing includes two bearings spaced from each other in the longitudinal direction. Each bearing is received in one of the enlarged annular sections. The body and the cap are formed by forging. A connecting portion extends upward from the top portion of the body. The connecting portion is annular. The bottom end of the cap is engaged with the connecting portion of the body. The top cover is detachably mounted to the top end of the cap. The top cover further includes two ribs spaced from each other. Each rib extends between the top and bottom portions of the top cover. The two ribs define an open space. The bottom portion of the top cover is annular and defines a mounting hole. A fixing ring is mounted to each of upper and lower sides of the top portion of the top cover. The fixing rings retain the two bearings.

In another embodiment, the bottom portion of the top cover includes two notches spaced from each other.

In a second aspect, a valve includes a body having an interior defining a fluid passage. The body includes a top portion having a chamber in communication with the fluid passage. A valve rod includes upper and lower ends spaced from each other in a longitudinal direction. The valve rod further includes an intermediate portion between the upper and lower ends of the valve rod. The lower end of the valve rod extends into the chamber. A plug is mounted to the lower end of the valve rod. A hand wheel is mounted to the upper end of the valve rod. A cap is mounted to the top portion of the body. The cap includes an axial hole. The intermediate portion of the valve rod extends through the axial hole of the cap. A top cover includes top and bottom portions spaced from each other in the longitudinal direction. The bottom portion of the top cover is detachably mounted to the top end of the cap. The upper end of the valve rod extends through the top cover. The top cover has a top portion adjacent to the hand wheel. When the hand wheel is rotated, the valve rod and the plug are moved in the longitudinal direction to open or close the fluid passage.

In an embodiment, the top cover includes two ribs spaced from each other. Each rib extends between the top and bottom portions of the top cover. The ribs define an open space. A plurality of fillers is mounted in the axial hole of the cap. A bushing is mounted on top of the plurality of the fillers and received in the axial hole of the cap. A pressing block is mounted on top of the bushing and located in the open space of the top cover. The bottom portion of the top cover includes a mounting hole having an inner diameter larger than an outer diameter of the pressing block. The intermediate portion of the valve rod extends through the plurality of fillers and the bushing. When the pressing block is in a pressed state, the plurality of fillers seals a gap between the valve rod and the cap. The bottom portion of the top cover includes two notches spaced from each other. The notches receive two sides of the pressing block.

The present invention will become clearer in light of the following detailed description of illustrative embodiments of this invention described in connection with the drawings.

DETAILED DESCRIPTION OF THE INVENTION

Figure 1:
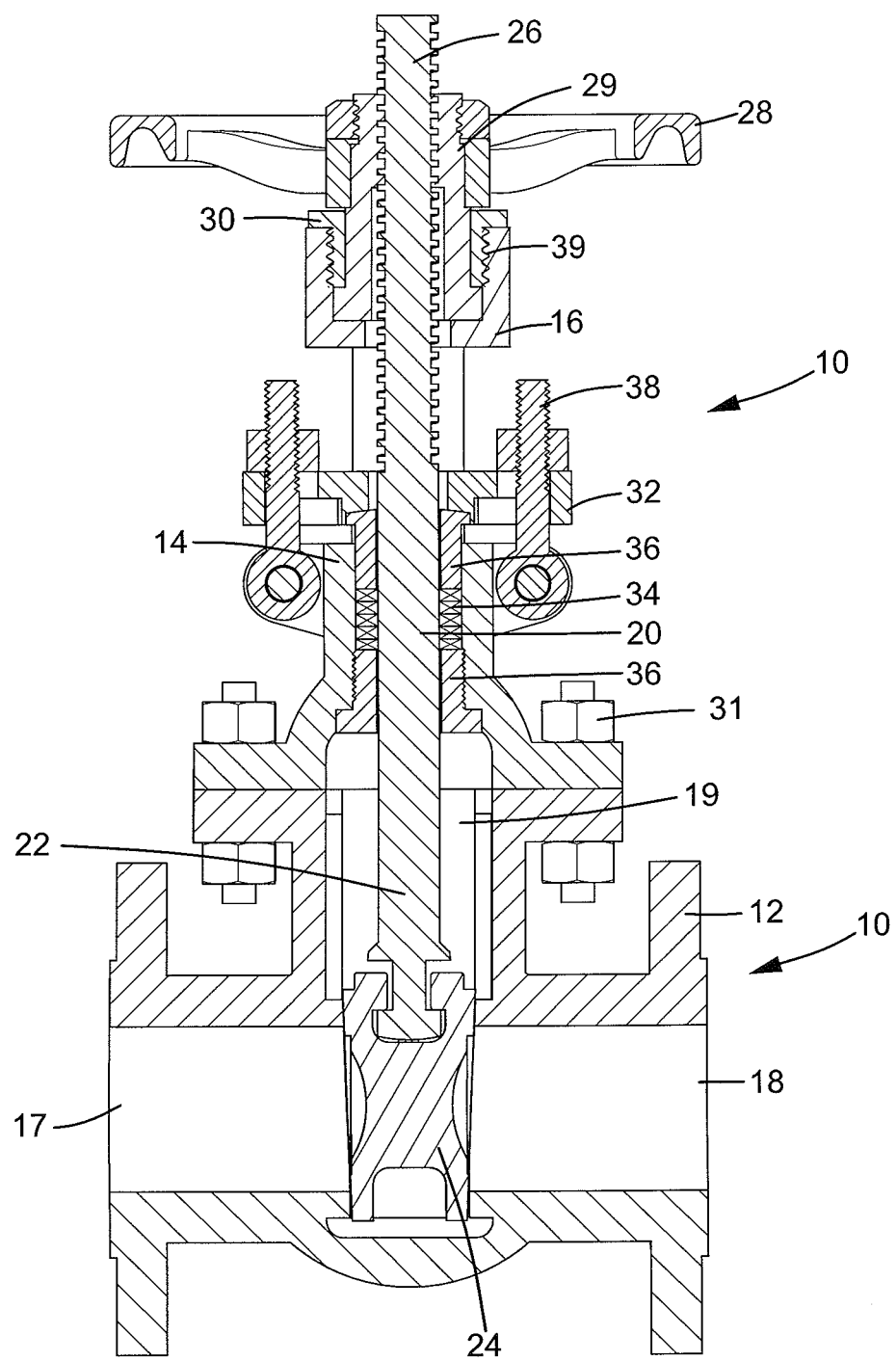
FIG. 1 shows a cross sectional view of a conventional valve.
Figure 2:
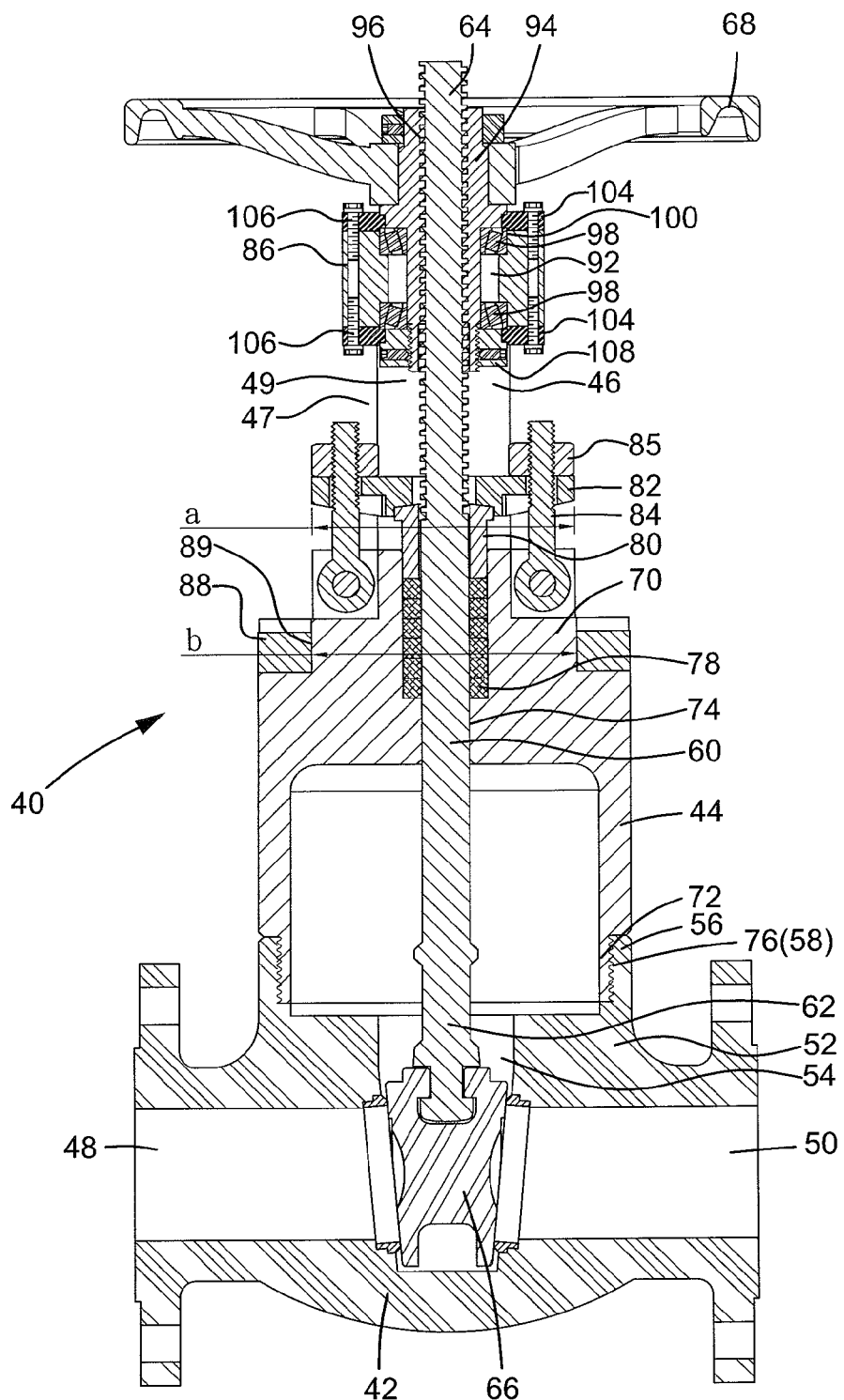
FIG. 2 shows a cross sectional view of a valve of a first embodiment according to the present invention.
Figure 3:
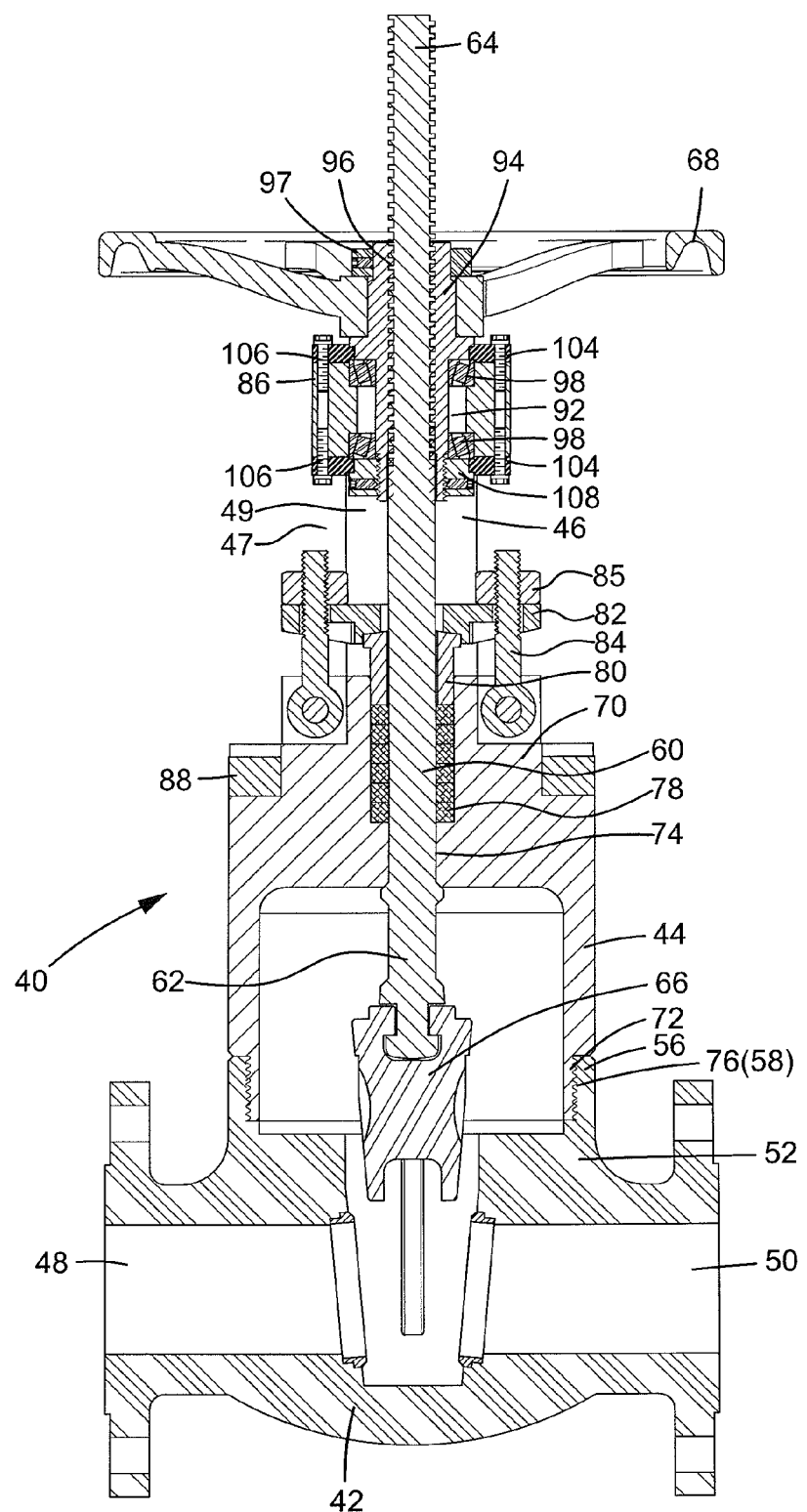
FIG. 3 is a view similar to FIG. 2, with a valve rod moved upward.
Figure 4:
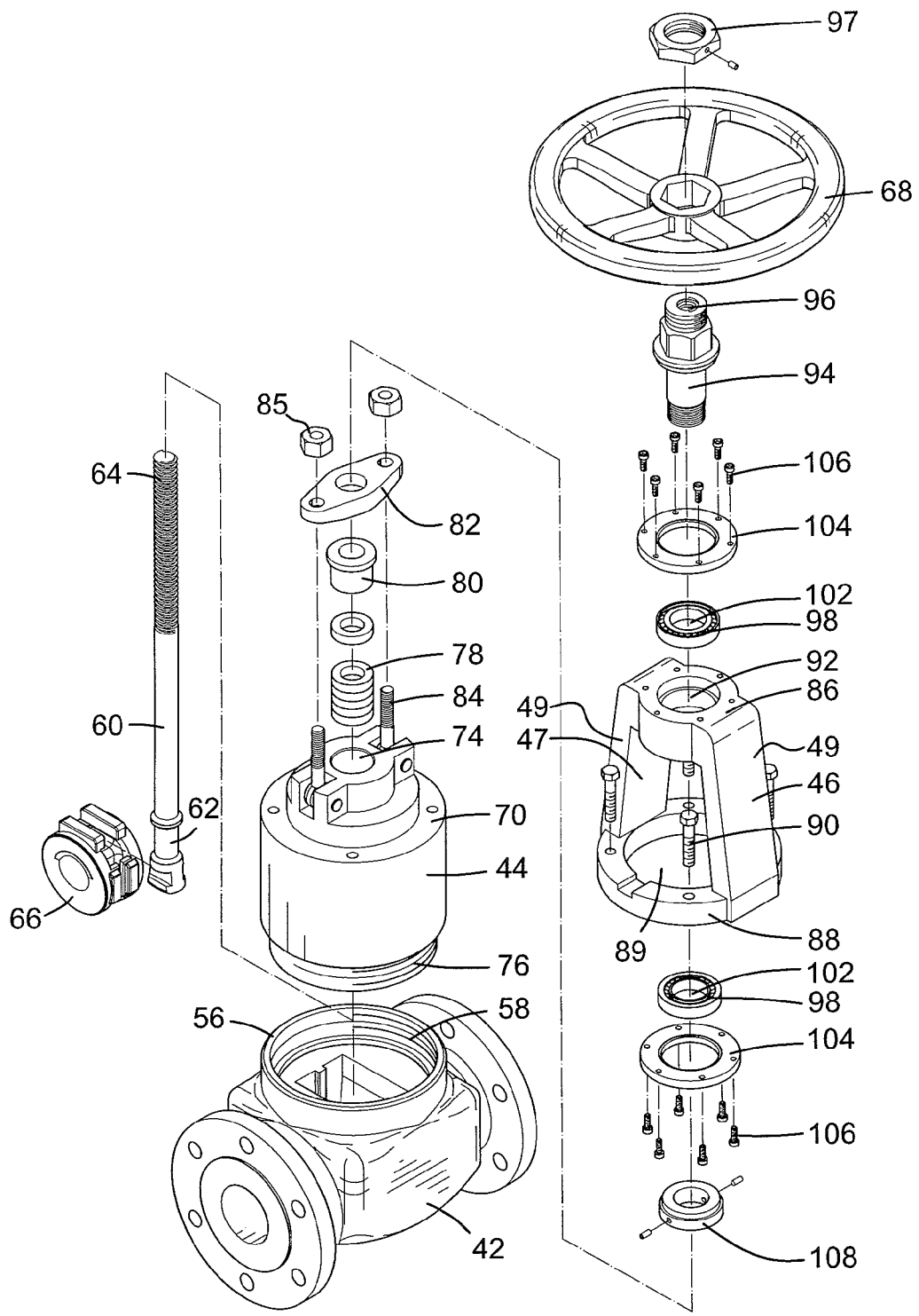
FIG. 4 shows an exploded, perspective view of the valve of FIG. 2.

With reference to FIGS. 2-4, a valve 40 of a first embodiment according to the present invention includes a body 42, a cap 44, and a top cover 46 removably mounted to the cap 44. The body 42 and the cap 44 are formed by forging. The top cover 46 can be formed by forging or casting. The body 42 includes an inlet 48 and an outlet 50 for connection with pipes. A chamber 54 is formed in a top portion 52 of the body 42 and in communication with a fluid passage between the inlet 48 and the outlet 50. A connecting portion 56 extends upward from the top portion 52 of the body 42. The connecting portion 56 is annular and includes a thread 58 on an inner periphery thereof. A valve rod 60 includes a lower end 62 and an upper end 64 spaced from the lower end 62 in a longitudinal direction. The lower end 62 of the valve rod 60 extends into the chamber 54 and is connected to a plug 66. The upper end 64 of the valve rod 60 has a thread. A hand wheel 68 is mounted to the upper end 64 of the valve rod 60.

The cap 44 is mounted to the top portion 52 of the body 42 and includes a top end 70 and a bottom end 72 spaced from the top end 70 in the longitudinal direction. The cap 44 further includes an axial hole 74 extending from the top end 70 through the bottom end 72 in the longitudinal direction. The axial hole 74 has an enlarged lower section in the form shown in FIG. 2. A lower end at the enlarged lower section of the axial hole 74 is in communication with the chamber 54. The bottom end 72 of the cap 44 has a thread 76 engaged with the thread 58 on the connecting portion 56 of the body 42. After the cap 44 is engaged with the top portion 52 of the body 42, welding is carried out at the engagement section between the cap 44 and the top portion 52 of the body 42. A plurality of fillers 78 and a bushing 80 are received in an upper end of the axial hole 74 in the top end 70 of the cap 44. A pressing block 82 is mounted on a top face of the bushing 80 that is located on top of the fillers 78. Two tightening bolts 84 are positioned on the top end 70 of the cap 44, extend through the pressing block 82, and are engaged with two nuts 85. An intermediate portion of the valve rod 60 extends through the axial hole 74, the fillers 78, and the bushing 80. When the nuts 85 are rotated to press against the fillers 78 via the pressing block 82 and the bushing 80, the fillers 78 seal a gap between the valve rod 60 and the cap 44. The fillers 78 have annular cross sections.

The top cover 46 includes top and bottom portions 86 and 88 spaced from each other in the longitudinal direction. The bottom portion 88 of the top cover 46 is fixed by screws 90 to the top end 70 of the cap 44. The top cover 46 includes two ribs 49 defining an open space 47. The ribs 49 are spaced from each other in a width direction perpendicular to the longitudinal direction. Each rib 49 extends between the top and bottom portions 86 and 88. The pressing block 82 is received in the open space 47. The bottom portion 88 of the top cover 46 is annular and includes a mounting hole 89 (FIG. 4).

The pressing block 82 is located between the top and bottom portions 86 and 88 of the top cover 46. A maximum width of the pressing block 82 is in the width direction perpendicular to the longitudinal direction. An inner diameter b of the mounting hole 89 is larger than an outer diameter a of the pressing block 82. The upper end 64 of the valve rod 60 extends through the top cover 46. The top portion 86 of the top cover 46 is located adjacent to the hand wheel 68. A compartment 92 is formed in the top portion 86 of the top cover 46 and receives a sleeve 94. The sleeve 94 includes a screw hole 96. The upper end 64 of the valve rod 60 extends through and is threadedly engaged with the screw hole 96 of the sleeve 94. An upper end of the sleeve 94 extends beyond the top cover 46 and the hand wheel 68. A retaining ring 97 is mounted around the upper end of the sleeve 94 to retain the sleeve 94. When the hand wheel 68 rotates, the sleeve 94 rotates freely in the compartment 92 of the top cover 46, and the valve rod 60 and the plug 66 move upward or downward to open or close the fluid passage in the body 42 (FIGS. 2 and 3).

At least one bearing 98 is mounted in the compartment 92 of the top cover 46. In the embodiment shown in FIG. 2, two bearings 98 are mounted in the compartment 92 of the top cover 46 and spaced from each other in the longitudinal direction. The compartment 92 includes two enlarged annular sections 100 spaced from each other in the longitudinal direction. Each bearing 98 is mounted in one of the enlarged annular sections 100. A lower section of the sleeve 94 is extended through a central hole 102 of each bearing 98 and supported by the bearings 98. A fixing ring 104 is mounted to each of upper and lower sides of the top portion 86 of the top cover 46. Screws 106 extend through each fixing ring 104 into the top portion 86 of the top cover 46. Thus, the bearings 98 are positioned in the compartment 92 of the top cover 46. Furthermore, a positioning ring 108 is threadedly engaged with a lower end of the sleeve 94 and abuts a bottom face of a lower one of the bearings 98, preventing the sleeve 94 from disengaging from the top cover 46.

Figure 5:
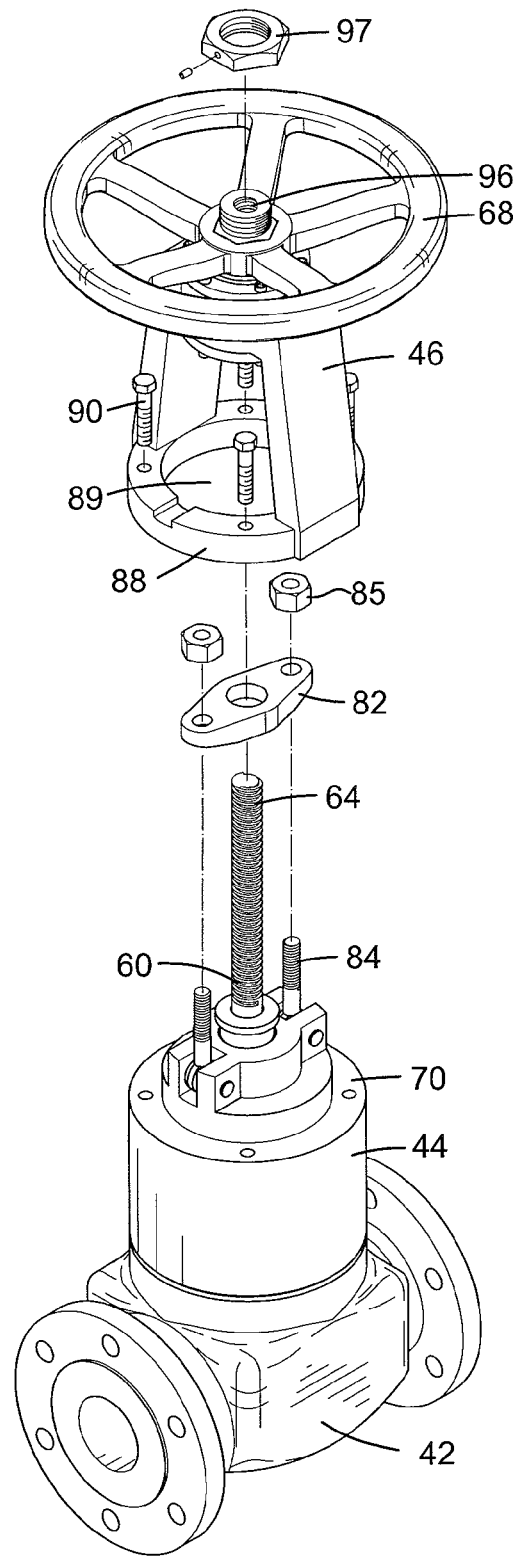
FIG. 5 shows a perspective view of the valve of FIG. 2, with a top cover and a pressing block detached for replacing fillers.
Figure 6:
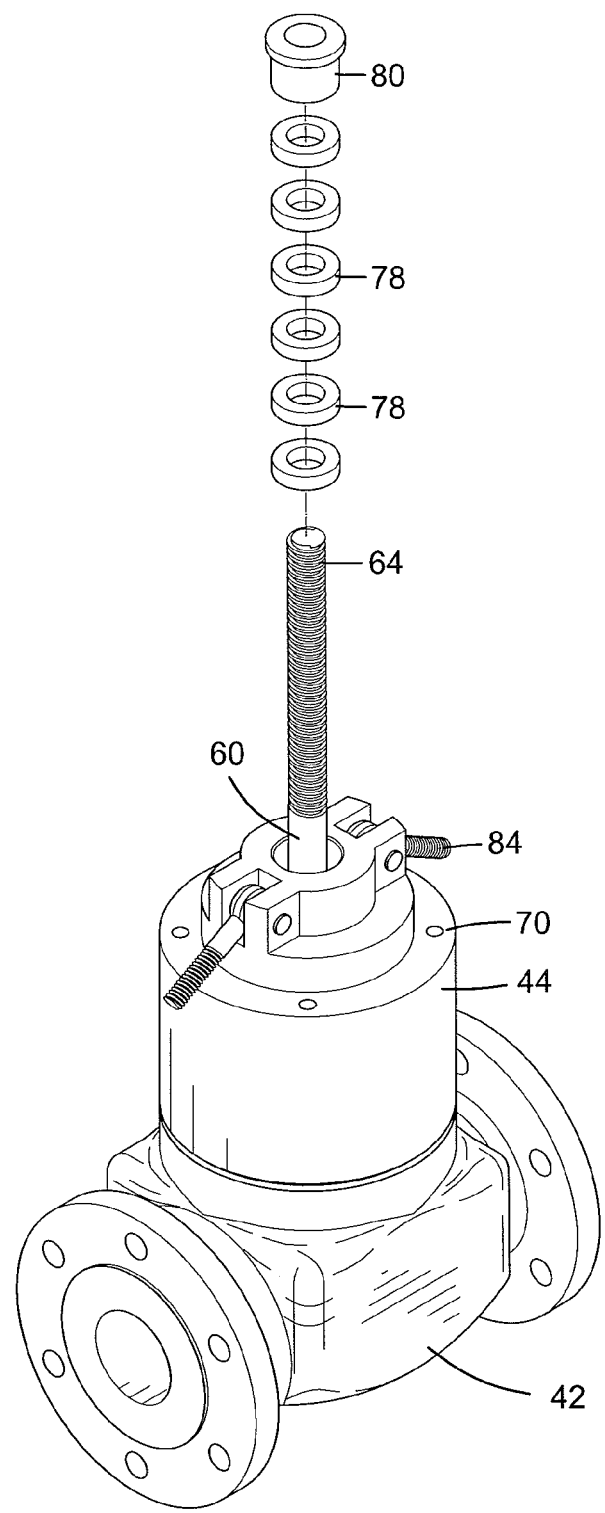
FIG. 6 is a perspective view illustrating removal of the fillers out of a cap of the valve.

Since the body 42 and the cap 44 of the valve 40 according to the present invention are formed by forging and, thus, free of voids in the inner faces thereof, generation of slits resulting from chemical corrosion at the voids is avoided. Furthermore, the bottom end 72 of the cap 44 and the body 42 are threadedly engaged with each other and welded, providing a firm engagement between the body 42 and the cap 44 without the risk of leakage of the fluid being conveyed through the valve 40. Further, the sleeve 94 is supported by the bearings 98 and, thus, can rotate smoothly without the risk of getting stuck and rusting, assuring smooth operation of the hand wheel 68. Further, the bearings 98 avoid wobbling of the valve rod 20 during longitudinal and rotational movement of the valve rod 20 while reliably positioning the valve rod 20, effectively prolonging the service life of the fillers 78. Further, since the top cover 46 is detachably mounted to the top portion 86 of the cap 44 and since the inner diameter b of the mounting hole 89 of the top cover 46 is larger than the outer diameter a of the pressing block 82, when the fillers 78 are damaged, the top cover 46 can be detached (FIG. 5), and the damaged fillers 78 can be removed out of the cap 44 by using a tool for subsequent replacement (FIG. 6). In the states shown in FIGS. 5 and 6, the plug 66 at the lower end 62 of the valve rod 60 is still in the chamber 54 such that the fillers 78 can be replaced without stopping the machine. Further, the new fillers 78 can be mounted around the valve rod 60 via the upper end 64 of the valve rod 60. The fillers 78 can be annular and free of openings, increasing the sealing effect of the fillers 78 and prolonging the service life of the fillers 78.

Figure 7:
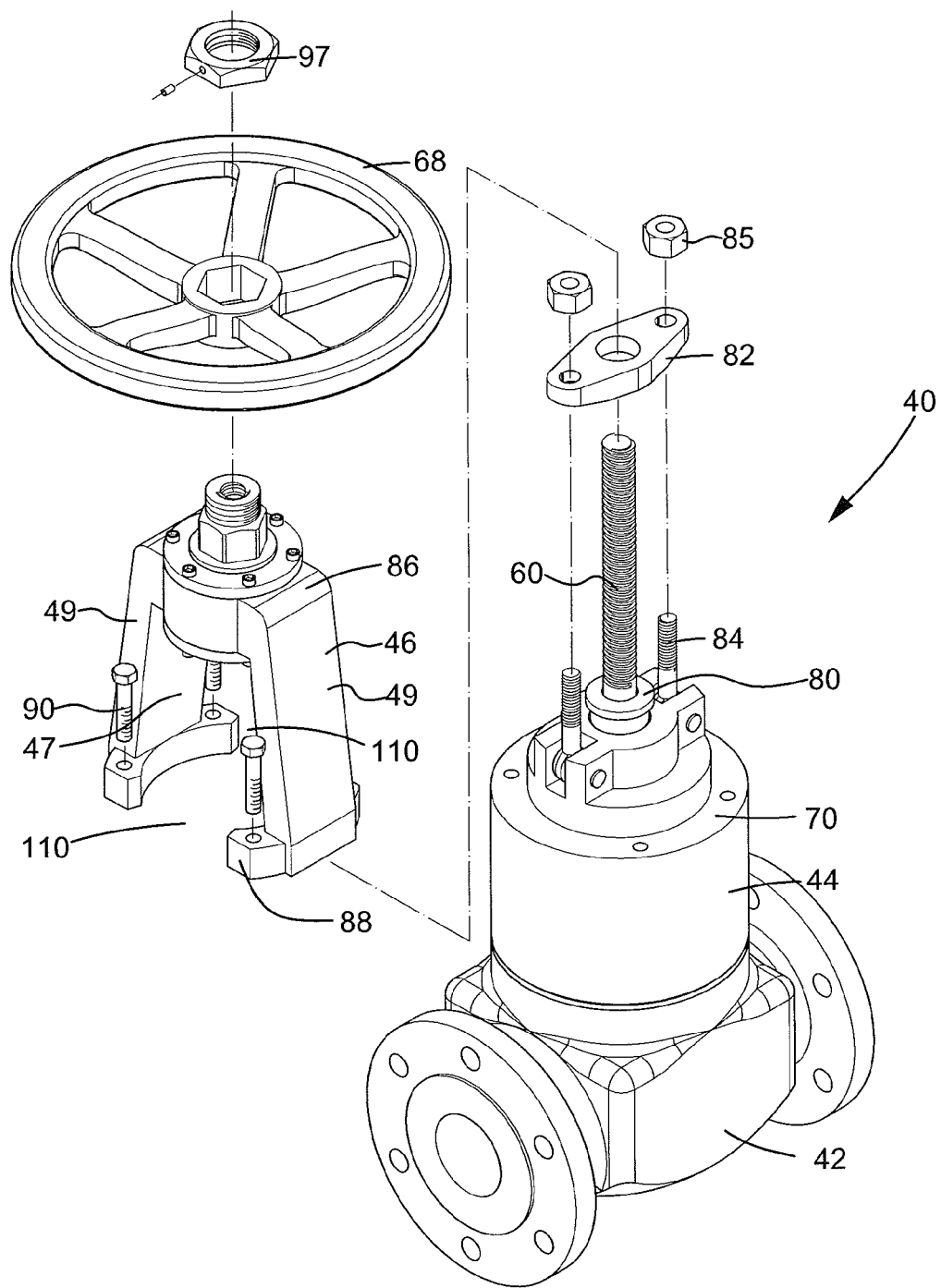
FIG. 7 shows an exploded, perspective view of a valve of a second embodiment according to the present invention.

FIG. 7 shows a valve 40 of a second embodiment according to the present invention that is substantially the same as the first embodiment except that the bottom portion 88 of the top cover 46 has two notches 110. The notches 110 receive two sides of the pressing block 82, allowing easy removal of the top cover 46 for replacing the fillers 78. Namely, when the fillers 78 are damaged, the top cover 46 is detached, and the damaged fillers 78 are removed out of the cap 44 by using the tool for replacement purposes.

Although specific embodiments have been illustrated and described, numerous modifications and variations are still possible without departing from the scope of the invention. The scope of the invention is limited by the accompanying claims.

The invention claimed is:

1. A valve comprising:
   a body including an interior defining a fluid passage, with the body including a top portion having a chamber in communication with the fluid passage;
   a valve rod including upper and lower ends spaced from each other in a longitudinal direction, with the valve rod further including an intermediate portion between the upper and lower ends of the valve rod, with the lower end of the valve rod extending into the chamber, with a plug mounted to the lower end of the valve rod, and with a hand wheel mounted to the upper end of the valve rod;
   a cap mounted to the top portion of the body, with the cap including top and bottom ends spaced from each other in the longitudinal direction and an axial hole extending from the top end through the bottom end, with the intermediate portion of the valve rod extending through the axial hole of the cap;
   a top cover including top and bottom portions spaced from each other in the longitudinal direction, with the bottom portion of the top cover mounted to the top end of the cap, with the top portion of the top cover including a compartment, with a sleeve received in the compartment and having a screw hole, with the upper end of the valve rod extending through and threadedly engaged with the screw hole, and with the upper end of the sleeve extending beyond the top cover and engaged with the hand wheel; and
   at least one bearing mounted in the compartment of the top cover, with the lower end of the sleeve extending through the at least one bearing,
   wherein when the hand wheel is rotated, the sleeve is driven to move the valve rod and the plug to open or close the fluid passage,
   with the compartment including two enlarged annular sections spaced from each other in the longitudinal direction, with the at least one bearing including two bearings spaced from each other in the longitudinal direction, and with each of the two bearings received in one of the two enlarged annular sections, and
   with the top cover formed by forging and detachably mounted to the top end of the cap, with a fixing ring mounted to each of upper and lower sides of the top portion of the top cover, and with the fixing rings retaining the two bearings.

2. The valve as claimed in claim 1, with the body and the cap formed by forging, with a connecting portion extending upward from the top portion of the body, with the connecting portion being annular, and with the bottom end of the cap engaged with the connecting portion of the body.

3. The valve as claimed in claim 1, with the top cover detachably mounted to the top end of the cap, with the top cover further including two ribs spaced from each other, with each of the two ribs extending between the top and bottom portions of the top cover, and with the two ribs defining an open space.

4. The valve as claimed in claim 1, with the bottom portion of the top cover being annular and defining a mounting hole, and with the bottom portion of the top cover engaged with the top end of the cap.

5. The valve as claimed in claim 4, with the bottom portion of the top cover including two notches spaced from each other.

* * * * *